United States Patent [19]

Stana et al.

[11] 4,316,800
[45] Feb. 23, 1982

[54] RECOVERY OF URANIUM FROM ENRICHED SOLUTION BY A MEMBRANE SEPARATION PROCESS

[75] Inventors: Regis R. Stana, Lakeland, Fla.; Erich W. Tiepel, Littleton, Colo.

[73] Assignees: Uranerz U.S.A. Inc, Wheat Ridge; Wyoming Mineral Corp., Lakewood, both of Colo.; Minatome Corp., New York, N.Y.

[21] Appl. No.: 13,702

[22] Filed: Feb. 21, 1979

[51] Int. Cl.³ .................. B01D 13/00; C016 56/00; E21B 43/00
[52] U.S. Cl. ........................ 210/651; 423/3; 299/5; 299/7
[58] Field of Search .......... 210/23 H, 23 F, 22; 423/3, 8–10, 15, 17, 18, 20; 299/3–5, 7

[56] References Cited

U.S. PATENT DOCUMENTS

| | | | |
|---|---|---|---|
| 2,979,378 | 4/1961 | Koble | 423/17 |
| 2,992,887 | 7/1961 | Thunaes et al. | 423/9 |
| 3,593,855 | 7/1971 | Stana | 210/500 M |
| 3,795,609 | 3/1974 | Hill et al. | 210/23 H |
| 3,816,587 | 6/1974 | Gosser | 210/23 H |
| 3,957,504 | 5/1976 | Ho et al. | 210/23 |
| 3,966,872 | 6/1976 | Sundar et al. | 423/9 |
| 4,105,253 | 8/1978 | Showalter | 299/4 |

OTHER PUBLICATIONS

Sastri et al. "Reverse Osmosis Performance of Cellulose Acetate Membranes etc." Separation Science 11(4), pp. 361–376, 1976.

Primary Examiner—Charles N. Hart
Assistant Examiner—E. Rollins Cross
Attorney, Agent, or Firm—D. P. Cillo

[57] ABSTRACT

A method for concentrating and recovering uranium material from a solution containing uranium, comprises passing the solution through at least one semipermeable membrane system capable of concentrating uranium, to provide a uranium rich product.

8 Claims, 1 Drawing Figure

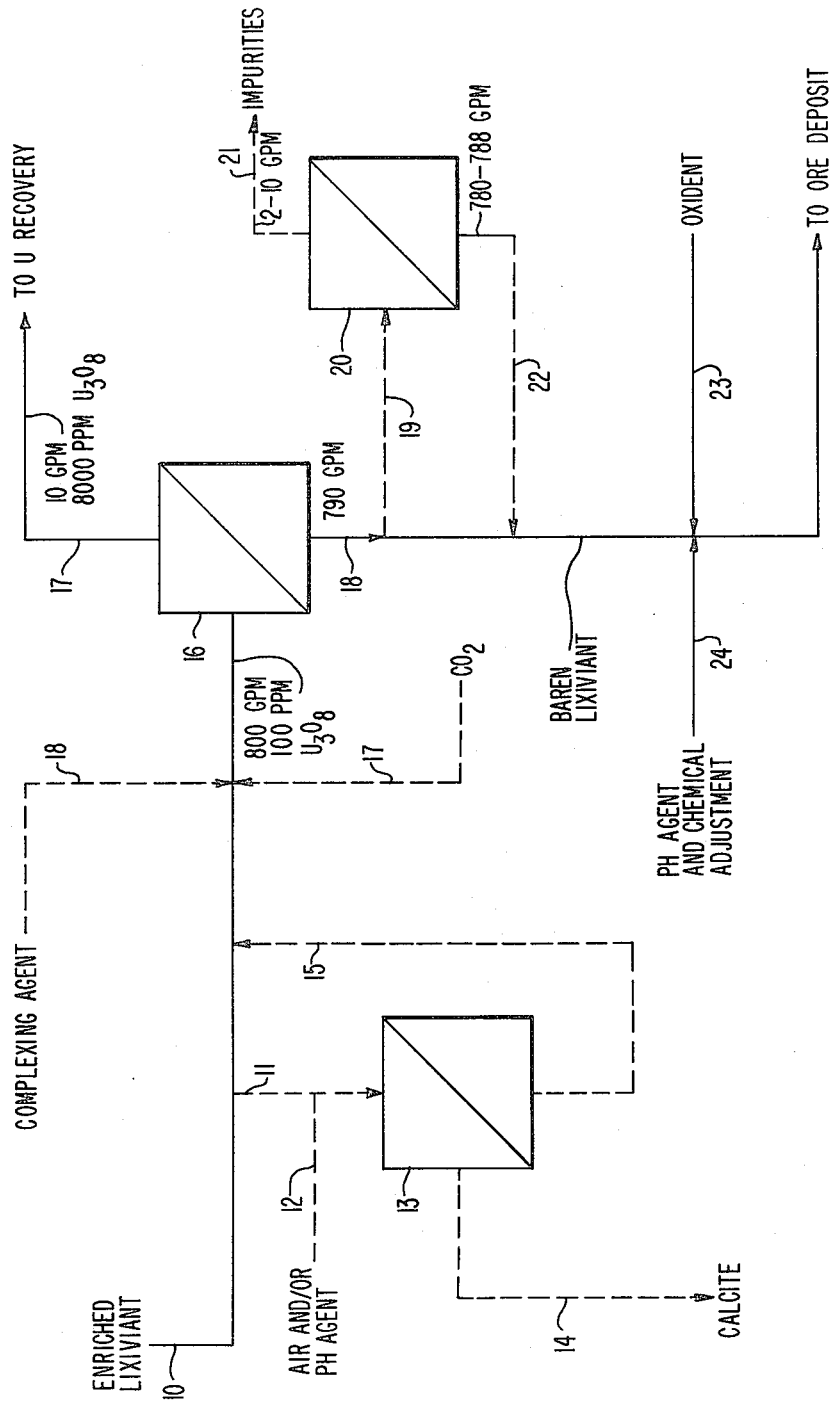

RECOVERY OF URANIUM FROM ENRICHED SOLUTION BY A MEMBRANE SEPARATION PROCESS

BACKGROUND OF THE INVENTION

This invention generally relates to purification of uranium enriched solutions. The in-situ leaching of mineral values from subterranean deposits is well known in the art as a practical means for recovering certain elements such as uranium, molybdenum, vanadium and the like. Basically, solution mining is carried out by injecting into the subterranean deposit, a lixiviant solution which will solubilize the mineral value desired to be recovered. The solution and solubilized mineral values are then recovered from the deposit for subsequent separation of the mineral values. Often it is necessary to oxidize the mineral value to a form where it can form a soluble reaction product in the lixiviant solution.

Depending upon the nature of the subterranean deposit, the typical lixiviant solution may be an acid, for example, an aqueous sulfuric acid solution, or may comprise an alkaline carbonate solution. In view of the high proportion of carbonates typically present in some subterranean formations, the use of acid solution in these ore bodies is usually prohibitive, because of the excessive consumption of acid due to carbonate solubilization. Consequently, alkaline carbonate lixiviant solutions are preferred to acid solutions for solution mining operations when high levels of carbonates are present in the formation. Various solution mining processes, involving the use of alkaline carbonate and non-alkaline carbonate leaching solutions are taught in U.S. Pat. No. 2,992,887 and U.S. Pat. No. 4,105,253 respectively.

The lixiviant, enriched with uranium, along with other ions such as calcium, molybdenum and vanadium, and other trace species, is pumped to the surface, where the uranium is recovered, generally by some type of ion exchange process. During the ion exchange process, the uranium is exchanged for other anions. Typically, the preferred anion is chloride, but other anions can be used, such as sulfate and carbonate. A similar approach using hollow fiber, flat sheet or tubular shaped polymeric ion exchange membranes, in a membrane extraction process, is taught by Ho et al., in U.S. Pat. No. 3,957,504.

After the ion exchange process, the barren lixiviant is refortified with bicarbonate, and oxidant and is recycled through the underground formation. In this manner, as the uranium is leached from the formation, the anion exchanged for the uranium increases in concentration in the lixiviant. At the end of the mining phase, the lixiviant must be returned to its initial groundwater state, i.e., all ions in solution must be near their initial or some predetermined, acceptable concentration. As such, the chloride or other anions that were exchanged for uranium, as well as residual lixiviant constituents, must be removed from the water at considerable expense.

Reverse osmosis processes are well known as means for purifying sea or waste water solutions, containing from about 100 to 5,000 parts, per million parts water, of salt or other dissolved solids, as taught by Stana, in U.S. Pat. No. 3,593,855. Reverse osmosis has also been used to remove dissolved minerals, such as iron, calcium, magnesium, manganese, and aluminum from sulfate containing, contaminated, acid mine drain waters, which have generally been pretreated by chlorination and ferrous iron oxidation, as taught by Hill et al., in U.S. Pat. No. 3,795,609.

Sastri and Ashbrook, in *Separation Science*, 11(4), pp. 361–376, 1961, describe the use of single step reverse osmosis as the means to remove uranyl sulfate, $UO_2\cdot SO_4$, from mine water feed. The metal ions separated are $Ca^{+2}$, $Fe^{+3}$, $Al^{+3}$ and $U^{+6}$, using supported, preshrunk, "tight", cellulose acetate permselective membranes, having rejection rates of between about 50% to 90% on aqueous NaCl. Such a system would have a very low purified material flux.

What is needed, is a commercially feasible, economical process, specifically adapted to concentrate the small amounts of uranium in the natural valence state, present in enriched lixiviant solutions, while maintaining the basic lixiviant solution for recycle to the underground formation. This process should limit the requirement of addition of any chemicals or introduction of any ions that will interfere with the further processing of the uranium rich concentrate or contaminate the lixiviant that is returned to the subterranean deposit.

SUMMARY OF THE INVENTION

The above-described need is met by passing a solution containing uranium through at least one separation system, containing at least one semipermeable membrane capable of concentrating uranium, to concentrate uranium and pass a substantial portion of the solution, and to provide a uranium concentrate solution stream. In one embodiment, the solution is enriched solution mining lixiviant. Optionally, calcium may be removed from enriched lixiviant by pretreating the lixiviant with substances effective to raise the pH of the lixiviant, to form a filterable precipitate; or calcium may be made more soluble in the lixiviant by pretreating lixiviant with a substance effective to lower the pH of the lixiviant, so that calcium passes through the semipermeable membrane of the separation system.

DESCRIPTION OF THE DRAWINGS

For a better understanding of the invention, reference may be made to the preferred embodiment exemplary of the invention, shown in the accompanying drawings, which is a flow diagram illustrating one embodiment of the method of this invention.

DESCRIPTION OF THE PREFERRED EMBODIMENTS

Ore deposits, containing uranium, generally in the highly insoluble tetravalent state, and usually associated with contaminating metals and elements, such as calcium, magnesium, molybdenum, vanadium and iron, can be leached to recover a high proportion of the uranium, using a solution mining process. The uranium enriched lixiviant solution may contain from about 15 to about 1,000 ppm. (parts per million of the solution) of dissolved uranium, depending on the richness of the ore, the length of time of contact of the lixiviant solution with the ore, and the porosity of the deposit, as well as other factors.

A convenient and well-known method for carrying out the leaching of the ore, is to dispose a patterned array of injection wells into a roll front ore deposit, the well walls having perforated sections at the ore zone between the upper and lower mudstone strata, so that lixiviant can be forced from the well into the ore zone. Several withdrawal wells are spaced a suitable distance from the injection wells. The withdrawal wells also have perforated sections in their walls in the ore zone, so that lixiviant enriched in uranium by reason of its passage through the ore can enter and be pumped out to a surface treatment plant to recover the uranium. A hydraulic gradient is maintained between the injection and withdrawal wells so the leach solution will flow from the former to the latter.

The uranium recovery treatment of this invention comprises a semipermeable membrane system. In a typical ultrafiltration or reverse osmosis system of the tubular type, the contaminated fluid is pumped through a battery of connected tubes. There can be as many as 150 tubes in each battery. The tubes serve to support a reverse osmosis or ultrafiltration membrane contacting the inside surface of the tube wall. The tube can be made of a variety of materials such as porous fiberglass, stiff filter paper, wire mesh, perforated stainless steel, or resin bonder filler particle tubes, such as porous, molded, phenolic, melamine, epoxy or polyester resin coated sand. Of course, other reverse osmosis or ultrafiltration configurations, such as flat plate, spiral wound and hollow fine fiber type reverse osmosis modules, which are well known in the art, can also be used in the semipermeable membrane system used in this invention.

A wide variety of semipermeable, i.e., permselective reverse osmosis of ultrafiltration membranes may be used in the separation systems used in the method of this invention. U.S. Pat. Nos. 3,593,855; 3,835,207; and 3,744,642, herein incorporated by reference, describe respectively, typical modified cellulose acetate type semipermeable membranes; polyamic acid salt perselective membranes having a high concentration of hydrophilic carboxylate salt groups; and polyamide, polyphenylester, polysulfone and polysulfonamide filtration membranes, all of which are useful in the method of this invention, along with a wide variety of other well-known semipermeable membranes.

The semipermeable ultrafiltration membranes useful in the uranium removal system of this invention, are those effective to reject a molecule having a molecular weight of over about 200. These membranes have the characteristics of NaCl rejection, at 300 psi. and 2,000 ppm. salt concentration, of about 10% to about 20%. In some instances, when, as an optional step in the method of this invention, a uranium complexing agent is used, a somewhat looser semipermeable membrane, of about 5% to about 10% NaCl rejection, capable of rejecting molecules of over about 1,500 molecular weight may be used. Thus, the term "semipermeable membrane capable of concentrating uranium" as used herein, means a membrane system capable of rejecting molecules of over about 200 molecular weight when no complexing agent is used, and a membrane system capable of rejecting molecules over about 1,500 molecular weight when a complexing agent is used. In all cases, the use of these loose membranes will provide approximately 10 times the purified material flux rate than a "tight" low flux membrane of about 75% NaCl rejection. None of the membranes useful in the method of this invention are of the ion exchange type.

Referring now to FIG. 1 of the drawings, the method of this invention is shown. Uranium enriched lixiviant solution, containing from about 15 ppm. to about 1,000 ppm. (parts per million in solution), generally about 50 to 100 ppm. of uranium, about 400 to 700 ppm. of calcium, up to about 300 ppm. of vanadium, up to about 300 ppm. of magnesium, up to about 20 ppm. of molybdenum, up to about 5 ppm. of iron, up to about 1 ppm. of rhenium, and up to about 1 ppm. of radium, is drawn from the solution mining withdrawal well to provide a mainstream 10.

As an optional first step, the uranium enriched lixiviant, having a pH of from about 1 to 10.5, generally from about 5.5 to about 9.5, can be fed into line 11, where it is contracted with substances effective to raise the pH of the lixiviant. The lixiviant can be sparged or otherwise contacted with air from line 12, at a rate of about 50 to about 150 cu.ft/min/800 gpm. (gallons per minute) of lixiviant generally in combination with another pH agent, such as a selected base.

The air and/or base is used in an amount effective to raise the pH of the lixiviant to between about 9 to 10, resulting in precipitation of calcium as calcium carbonate, which is then removed from the lixiviant. A suitable base, such as at least one of $NaOH, NH_4OH, CaO, Na_2CO_3$ and the like, can be added as a substitute for or in combination with air. This solution, with precipitated calcium carbonate, is fed into a settling/filtration system, or preferably a calcium recovery system 13 containing at least one semipermeable membrane capable of concentrating calcium, to concentrate calcium and pass a substantial, i.e., major portion of the uranium containing lixiviant.

The semipermeable membrane that can be used in optional system 13, to remove calcium, is preferably a tubular type, having an NaCl rejection of 15% to 25% at 300 psi. and 2,000 ppm. An ultrafiltration system is especially good for this separation, since there is extremely good contact between the solution and the precipitate, relieving all calcium carbonate supersaturation. The calcite slurry exits via line 14, and the uranium enriched lixiviant re-enters the main stream through line 15. In this step the membrane is effective to allow passage of substantially all of the uranium contained in the lixiviant. This optional first step can be used in those cases where the enriched lixiviant has a pH of below about 10, and contains a very high calcium content, i.e., about 300 to 700 ppm.

The enriched lixiviant is then ready to enter the main uranium recovery system 16. Optionally, before entering system 16, the enriched lixiviant can have a substance added in an amount effective to lower the pH of the lixiviant, such as bicarbonate, preferably in the form of $CO_2$ gas from line 17. The $CO_2$ can contact the lixiviant at a rate of about 5 to about 30 cu.ft/min/800 gpm. of lixiviant. Effective amounts of acids such as HCl and $H_2SO_4$ can also be used. The $CO_2$ or acid is used in an amount effect to decrease the pH of the lixiviant to between about 4 to 7, resulting in increasing the solubility of the calcium as calcium carbonate, so that it will more easily pass through the semipermeable membrane of system 16. This optional step can be used in those cases where the optional calcium recovery system 13 is not used, yet the calcium content of the lixiviant is relatively high, i.e., about 200 to 300 ppm., which is usually the case.

Optionally, before entering system 16, the enriched lixiviant can have a uranium complexing agent added to the lixiviant from line 18. These uranium complexing agents, which are all well known in the art, can be added in an amount effective to form a complex with a substantial amount of the uranium in the enriched lixiviant, to form high molecular weight uranium containing species, causing enhanced uranium removal in system 16. The amount of complexing agent may consitute from about 1 ppm. to about 150 ppm. of the solution.

Particularly useful uranium complexing agents include organic, surface active, non-ionic surfactant type chelating agents, such as primary, secondary, and tertiary alkyl amines, and alkylaryl polyether alcohols. The alkaryl polyether alcohols preferably have the chemical formula $C_nH_{2n+1}(C_6H_4)(OCH_2CH_2)_mOH$ where n is 8 to 9 and m is 5 to 9. Particularly suitable complexing agents are ethylene diamine tetra acetic acid, ethylene diamine, diethylene triamine, triethylene tetramine, and an octyl phenoxy polyethoxy ethanol, such as

$C_8H_{17}(C_6H_4)(OCH_2CH_2)_{7-8}OH$ averaging 7 to 8 ethylene oxide units per molecule. Similarly useful complexing agents include citric acid and di-2-ethylhexyl phosphoric acid-trialkylphosphine oxide, among others.

The semipermeable membrane used in system 16, which is at the heart of the process, is preferably at least one high flux spiral wound type. When no complexing agent is used, the useful membrane is effective to reject a molecule having a molecular weight of over about 200, i.e, a NaCl rejection of about 10% to about 20% at 300 psi. and 2,000 ppm. When an effective amount of complexing agent is used, the useful membrane is effective to reject a molecule having a molecular weight of over about 1,500, i.e, a NaCl rejection of about 5% to about 10% at 300 psi. and 2,000 ppm. Both of the membranes, i.e., up to about 20% NaCl rejection are herein defined as "ultrafiltration membranes". The uranium exits system 16 by line 17, i.e., does not pass through the semipermeable ultrafiltration membrane contained in system 16. Uranium baren lixiviant exits system 16 by line 18.

Where the enriched lixiviant fed to system 16 is about 800 gpm., with about 50 to 100 ppm. uranium as $U_3O_8$, the exit line 17 may contain about 10 gpm. with about 4,000 to 8,000 ppm. uranium as $U_3O_8$ concentrate, and exit line 18 will contain about 790 gpm. of barren lixiviant. Uranium rich line 17 can then be fed to a uranium recovery system which may involve a precipitation or other type process.

Optionally, exit line 18 can be fed into line 19 and into a purification system such as a high flux reverse osmosis system 20. The uranium barren lixiviant of line 18, when it exits system 16, contains substantial amounts of low molecular weight cations and anions which may include Na, Ca, Mg, $HCO_3$, Cl and $SO_4$, as well as minor amounts of impurities such as Mo, V, Ra, Rh, Fe and Mg. System 20 can optionally be used to concentrate and remove a substantial amount of the cations, anions and impurities, i.e., up to 95% of Mo, V and Ra; up to about 80% of $SO_4$ and Ca, and up to about 50% of all the other species.

The semipermeable membrane that can be used in the system 20 is preferably at least one spiral wound or hollow fine fiber semipermeable membrane, having a NaCl rejection of about 25% to about 50% at 300 psi. and 2,000 ppm. This membrane, having between 25% to 50% NaCl rejection is herein defined as a "high flux reverse osmosis membrane". A low flux reverse osmosis membrane, i.e., about 75% NaCl rejection is not desirable anywhere in the process because of its low flux rates. System 20 can be used to continuously remove all impurity species on a continuous basis, and thus clean up the well field during mining. For about 790 gpm. barren lixiviant into system 20, up to about 10 gpm. may exit in line 21 as impurity concentrate, and about 780 gpm. may exit in line 22 as purified barren lixiviant.

The barren lixiviant is then refortified with oxidant such as $H_2O_2$ from line 23, and the pH is adjusted with a suitable chemical agent to reconstitute the lixiviant concentration from line 24, before being fed back into the uranium ore via an injection well. Neither the oxidizing agent nor the pH agent are contaminants to the lixiviant. Using the process, at the end of the mining phase, little if any materials must be removed in order to provide uncontaminated groundwater, since no chlorides or other species generally used in ion exchange systems are added.

The use of optional systems 13 and 20 substantially increases the cost of the membrane uranium recovery system. The capital cost of an 800 gpm. system using only base system 16 is approximately $700,000 to $900,000. The capital cost for the same system using optional system 13, in addition to base system 16, is approximately $2,400,000. Addition of optional system 20 boosts the costs to approximately $3,200,000. Thus, unless the concentration of calcium is very high, the preferred system would have stream 10 charged with $CO_2$ gas and then directly fed into the main semipermeable membrane system 16, exiting as stream 18, which is directly fed back to the ore deposit after pH adjustment and addition of oxidant, with stream 17 being fed to the uranium recovery system.

We claim:

1. A method for concentrating uranium material from uranium enriched solution mining lixiviant containing uranium and calcium, comprising the steps of:
   (A) first, contacting the enriched lixiviant with a substance effective to raise the pH of the lixiviant, resulting in precipitation of calcium, which is then removed from the lixiviant, and then
   (B) having the pH adjusted, enriched lixiviant contact a separation system, containing at least one semipermeable, ultrafiltration membrane having the characteristic of NaCl rejection, at 300 psi. and 2,000 ppm. salt concentration, of about 5% to about 20% and capable of concentrating uranium, to concentrate uranium and pass a substantial portion of the lixiviant, to provide a uranium concentrate stream and a uranium barren stream containing low molecular weight cations, anions, and impurities.

2. The method of claim 1, where the lixiviant has a pH of from about 5.5 to about 9.5, the concentration of uranium which is solubilized and dissolved in the lixiviant, provided by in-situ subterranean leaching, is from about 15 ppm. to about 1,000 ppm., and the concentration of the calcium in the lixiviant is from about 400 ppm. to about 700 ppm.

3. The method of claim 1, where the solution is solution mining lixiviant, and where, before the lixiviant is passed through the first separation system, the lixiviant is contacted with an organic, surface active agent effective to complex with uranium in the lixiviant to form higher molecular weight uranium containing species.

4. The method of claim 1, where the substance effective to raise the pH of the lixiviant is air and a base, and the calcium is removed from the lixiviant by passing the lixiviant through a calcium removal system containing at least one semipermeable membrane capable of concentrating calcium, to concentrate calcium and pass a substantial portion of lixiviant containing uranium.

5. The method of claim 4, where the membrane contained in the calcium removal system has the characteristic of NaCl rejection, at 300 psi. and 2,000 ppm. salt concentration, of about 15% to about 25%.

6. A method for concentrating uranium material from uranium enriched solution mining lixiviant containing uranium and calcium, comprising the steps of:
   (A) first, contacting the enriched lixiviant with a substance effective to lower the pH of the lixiviant, resulting in increasing the solubility of the calcium, and then
   (B) having the pH adjusted, enriched lixiviant contact a separation system, containing at least one semipermeable, ultrafiltration membrane having the characteristic of NaCl rejection, at 300 psi. and 2,000 ppm. salt concentration, of about 5% to about 20% and capable of concentrating uranium, to concentrate uranium and pass a substantial portion of the lixiviant, to provide a uranium concentrate stream and a uranium barren stream containing low molecular weight cations, anions, and impurities.

7. The method of claim 6, where the lixiviant has a pH of from about 5.5 to about 9.5, and is contacted with $CO_2$ in step (A).

8. The method of claim 6, where the concentration of uranium which is solubilized and dissolved in the lixiviant, provided by in-situ subterranean leaching, is from about 15 ppm. to about 1,000 ppm., and the concentration of the calcium in the lixiviant is from about 400 ppm. to about 700 ppm., and where, before the lixiviant is passed through the separation system, the lixiviant is contacted with an organic, surface active agent effective to complex with uranium in the lixiviant to form higher molecular weight uranium containing species.

* * * * *